United States Patent
Ito et al.

(10) Patent No.: US 9,793,041 B2
(45) Date of Patent: Oct. 17, 2017

(54) REACTOR, CORE PART FOR REACTOR, CONVERTER AND POWER CONVERSION DEVICE

(71) Applicants: Sumitomo Electric Industries, Ltd., Osaka-shi (JP); Sumitomo Wiring Systems, Ltd., Yokkaichi-shi (JP); AutoNetworks Technologies, Ltd., Yokkaichi-shi (JP)

(72) Inventors: Atsushi Ito, Osaka (JP); Shinichiro Yamamoto, Osaka (JP); Junji Ido, Yokkaichi (JP)

(73) Assignees: Sumitomo Electric Industries, Ltd., Osaka-shi (JP); Sumitomo Wiring Systems, Ltd., Yokkaichi-shi (JP); AutoNetworks Technologies, Ltd., Yokkaichi-shi (JP)

( * ) Notice: Subject to any disclaimer, the term of this patent is extended or adjusted under 35 U.S.C. 154(b) by 287 days.

(21) Appl. No.: 14/380,683

(22) PCT Filed: Nov. 5, 2012

(86) PCT No.: PCT/JP2012/078622
§ 371 (c)(1),
(2) Date: Aug. 22, 2014

(87) PCT Pub. No.: WO2013/125102
PCT Pub. Date: Aug. 29, 2013

(65) Prior Publication Data
US 2015/0043262 A1   Feb. 12, 2015

(30) Foreign Application Priority Data
Feb. 24, 2012 (JP) .................................. 2012-038679

(51) Int. Cl.
H01F 17/06  (2006.01)
H01F 21/06  (2006.01)
(Continued)

(52) U.S. Cl.
CPC ......... H01F 27/255 (2013.01); H01F 27/263 (2013.01); H01F 27/324 (2013.01);
(Continued)

(58) Field of Classification Search
USPC .................................................. 336/178, 212
See application file for complete search history.

(56) References Cited

U.S. PATENT DOCUMENTS

2006/0022679 A1* 2/2006 Obata .................... G01R 31/06
324/551
2009/0315663 A1* 12/2009 Kiyono ...................... H01F 3/14
336/219
(Continued)

FOREIGN PATENT DOCUMENTS

JP   2006-294829 A   10/2006
JP   2008-078219 A    4/2008
(Continued)

OTHER PUBLICATIONS

Japanese translation of WO2011132361.*
(Continued)

Primary Examiner — Ronald Hinson
(74) Attorney, Agent, or Firm — Venable LLP; Michael A. Sartori; Laura G. Remus

(57) ABSTRACT

A reactor 1 according to the present invention includes a coil 2 and a magnetic core 3 where the coil 2 is disposed. In the reactor 1, a core part 4A (4B) including a stacked columnar body having a plurality of core pieces 31m and a plurality of gap members 31g stacked and coating resin 5A (5B) in which a peripheral surface coating portion 51oA (51oB) for
(Continued)

coating an outer peripheral surface of the stacked columnar body to integrally hold the core piece 31m and the gap member 31g and an end surface coating portion 51eA for coating one end surface of the stacked columnar body are molded integrally is used for a part of the magnetic core 3, that is, an inner core 31. A manufacturing error of the core piece 31m or the gap member 31g is absorbed by the end surface coating portion 51eA. Consequently, the core part 4A (4B) can be molded with high accuracy and an outer core 32 can be assembled properly. Thus, the reactor 1 has high assembling workability.

9 Claims, 6 Drawing Sheets

(51) Int. Cl.

| | | |
|---|---|---|
| *H01F 27/24* | (2006.01) | |
| *H01F 27/06* | (2006.01) | |
| *H01F 27/255* | (2006.01) | |
| *H01F 37/00* | (2006.01) | |
| *H01F 27/26* | (2006.01) | |
| *H01F 27/32* | (2006.01) | |
| *H02M 7/537* | (2006.01) | |
| *H01F 3/10* | (2006.01) | |
| *H02M 3/155* | (2006.01) | |

(52) U.S. Cl.
CPC ............ *H01F 37/00* (2013.01); *H02M 7/537* (2013.01); *H01F 2003/106* (2013.01); *H02M 3/155* (2013.01)

(56) References Cited

U.S. PATENT DOCUMENTS

| | | | | |
|---|---|---|---|---|
| 2012/0206232 | A1* | 8/2012 | Yamamoto | ............... H01F 3/14 336/210 |
| 2013/0038415 | A1* | 2/2013 | Ooishi | .................. H01F 37/00 336/61 |
| 2013/0088317 | A1 | 4/2013 | Tawara et al. | |

FOREIGN PATENT DOCUMENTS

| | | |
|---|---|---|
| JP | 2010-238798 A | 10/2010 |
| JP | 2010-263075 A | 11/2010 |
| JP | 2011-082410 A | 4/2011 |
| JP | 2011-082412 A | 4/2011 |
| JP | 2011-119664 A | 6/2011 |
| JP | 2012-028572 A | 2/2012 |
| JP | 2013-084767 A | 5/2013 |

OTHER PUBLICATIONS

Office Action in Japanese Patent Application No. 2012-038679, dated Mar. 8, 2016.
Notification of the First Office Action in Chinese Patent Application No. 201280070531.7, dated Mar. 21, 2016.
International Search Report in PCT International Application No. PCT/JP2012/078622, dated Dec. 4, 2012.

* cited by examiner

US 9,793,041 B2

REACTOR, CORE PART FOR REACTOR, CONVERTER AND POWER CONVERSION DEVICE

TECHNICAL FIELD

The present invention relates to a reactor that is used for, for example, a component of a power conversion device, such as an on-vehicle direct current to direct current (DC-DC) converter mounted on a vehicle such as a hybrid electric vehicle. The present invention also relates to a core part for a reactor that is used for a component of the reactor, a converter including the reactor, and a power conversion device including the converter. The present invention more particularly relates to a core part for a reactor having high dimensional accuracy, and a reactor having high assembling workability with use of the core part.

BACKGROUND ART

A reactor is one of parts in a circuit that performs a step-up operation and a step-down operation of a voltage. For example, Patent Literature 1 discloses, as a reactor that is used for a converter mounted on a vehicle such as a hybrid electric vehicle, a reactor including a coil having a pair of coil elements arranged side by side, a magnetic core formed like a ring by a pair of inner cores (intermediate cores) where the coil elements are arranged respectively and a pair of outer cores (end cores) where the coil is not arranged, and a cylindrical bobbin and a frame-shaped bobbin which are provided between the coil and the magnetic core and enhance their insulation performance.

As described in Patent Literature 1, there is taken a mode in which the inner core is formed by a stacked steel plate obtained by stacking a thin sheet such as a silicon steel sheet or a stack obtained by alternately stacking a core piece formed by a powder magnetic core and a plate-shaped gap member made of ceramics or the like, and the outer core is formed by the core piece. The cylindrical bobbin is provided between the inner core formed by the stack and the coil element, and the frame-shaped bobbin is provided between an end surface of the coil element and an inner end surface disposed on the inner core side in the outer core (Patent Literature 1).

The reactor having the structure is assembled in the following manner.

(1) The core piece and the gap member are stacked to form the inner core.

(2) The cylindrical bobbin is disposed on an outer periphery of the inner core.

(3) Two inner cores including the cylindrical bobbin are fabricated and inserted into the coil elements, respectively.

(4) The core piece configuring the frame-shaped bobbin and the outer core is disposed to interpose the two inner cores which are disposed on the coil elements so that the two inner cores are arranged side by side, and the inner core and the outer core are properly bonded to each other.

CITATION LIST

Patent Literature

Patent Literature 1: Japanese Unexamined Patent Publication No. 2010-263075

SUMMARY OF INVENTION

Technical Problem

It is desired to enhance assembling workability of a reactor.

In the case in which the plurality of core pieces and the gap members are combined to form the magnetic core as described above, a length of the inner core might have a variation depending on a manufacturing error of the core piece or the gap member. If the variation is great, a gap is generated between one of the pair of inner cores arranged side by side and the outer core or the outer core is disposed with inclination when the other inner core and the outer core are bonded to each other, for example. In the case in which the inner core and the outer core are not properly coupled to each other, there is a fear that the reactor might not obtain a desirable inductance with high accuracy.

For example, it is possible to fill the gap or correct the inclination by regulating a thickness of an adhesive. In this case, however, an application quantity of the adhesive is varied for the inner cores arranged side by side. For this reason, assembling workability is deteriorated.

On the other hand, there is considered a case of enhancing dimensional accuracy of the core piece or the gap member. However, in the case in which the gap member is made of a processing resistant material having a very high hardness, for example, alumina, it is difficult to perform processing. In particular, it is necessary to process a plate member into a uniform thickness over a whole surface. For this reason, it is more difficult to process the plate member. Accordingly, a countermeasure against the enhancement in the dimensional accuracy has a limit. Therefore, it is necessary to carry out correction with the adhesive or the like as described above. Consequently, it is desired to enhance the assembling workability.

In the case in which the reactor includes a plurality of gap members, particularly, the manufacturing errors are added up on the assumption that all of the gap members are made of the processing resistant material described above. For this reason, a large variation easily occurs so that a correcting work is required more greatly. If the number of the gap members is increased, moreover, the number of parts and the number of steps are increased. Consequently, the assembling workability is deteriorated.

If the magnetic core, the cylindrical bobbin and the like are separate members as described above, furthermore, the number of parts and the number of steps are increased so that the assembling workability is deteriorated.

Therefore, it is an object of the present invention to provide a reactor having high assembling workability. Moreover, it is another object of the present invention to provide a core part for a reactor which has high dimensional accuracy and can contribute to enhancement in assembling workability of the reactor. In addition, it is a further object of the present invention to provide a converter which includes a reactor having high assembling workability, and a power conversion device including the converter.

Solution to Problem

The present invention achieves the objects by obtaining a compact in which an outer periphery of a stack formed by a core piece and a gap member is coated with resin and causing resin to be present in at least a part of end surfaces or both of the end surfaces of the stack, and forming the resin into an integrated product with the resin coating the outer periphery.

A reactor according to the present invention has a cylindrical coil and a magnetic core where the coil is disposed, and includes the following stacked columnar body which configures a portion disposed on an inside of the coil in the magnetic core and the following coating resin for coating at least a part of a surface of the stacked columnar body. In the stacked columnar body, a plurality of core pieces made of a magnetic material and at least one gap member made of a material having a lower magnetic permeability than the core piece are stacked. In coating resin, a peripheral surface coating portion for coating at least a part of an outer peripheral surface of the stacked columnar body to integrally hold the core piece and the gap member and an end surface coating portion for coating at least a part of an end surface of the stacked columnar body are molded integrally.

As a component of the magnetic core provided in the reactor according to the present invention, it is possible to preferably use a core part for the reactor according to the present invention which includes the stacked columnar body and the coating resin. The core part for the reactor according to the present invention is used for the magnetic core where the cylindrical coil is disposed, and includes the stacked columnar body having the plurality of core pieces and the at least one gap member stacked, and the coating resin having the peripheral surface coating portion and the end surface coating portion molded integrally.

In the present invention, a part of the magnetic core (typically, an inner core disposed on the inside of the coil) is formed by the stacked columnar body of the plurality of core pieces and the gap member, and is an integrated product (typically, the core part according to the present invention) obtained by integration through the peripheral surface coating portion. Therefore, the integrated product can easily be treated in the assembly of the coil and the magnetic core, for example. The peripheral surface coating portion is provided between the coil and the magnetic core and can function as an insulating material between both of them. In the present invention, accordingly, it is possible to omit the cylindrical bobbin and the disposing step.

In the present invention, moreover, at least one end surface of the integrated product is generally provided with the end surface coating portion made of resin having a lower magnetic permeability than the core piece configuring the magnetic core. Consequently, the end surface coating portion can be used for a magnetic gap. In the present invention, accordingly, the number of gap members and the number of stacking steps can be reduced.

By utilizing a metal mold in molding of the coating resin to define a thickness of the end surface coating portion provided on the end surface of the stacked columnar body through the metal mold, it is possible to mold the integrated product with high accuracy. Specifically, the metal mold is adjusted to regulate the thickness of the end surface coating portion and a manufacturing error of the core piece or the gap member configuring the stacked columnar body can be absorbed depending on the thickness. Consequently, it is possible to manufacture an integrated product having high dimensional accuracy. By utilizing the integrated product having high the dimensional accuracy, it is possible to construct the magnetic core well and it is not necessary to perform a correcting work, for example, locally thick application of the adhesive. Furthermore, it is not necessary to carry out processing for further enhancing the dimensional accuracy in the gap member to be stacked together with the core piece. Consequently, it is possible to increase a degree of freedom of the gap member which can be used.

From the foregoing, the reactor according to the present invention has small numbers of parts and steps and high assembling workability. The core part for the reactor according to the present invention has high dimensional accuracy. Therefore, it is possible to contribute to the enhancement in the assembling workability of the reactor.

As an aspect of the reactor according to the present invention, examples include a mode in which the coil includes a pair of coil elements, the magnetic core includes a pair of inner cores disposed on an inside of the coil elements respectively and formed by the stacked columnar body, and a pair of outer cores in which the coil elements are not disposed but are disposed to interpose both of the inner cores arranged side by side therebetween. With this mode, the coating resin includes the peripheral surface coating portion and the end surface coating portion which coat the stacked columnar body configuring one of the pair of inner cores, and the following frame-shaped portion. The frame-shaped portion is provided between an end surface of the coil element and an inner end surface disposed on the inner core side in the outer core and is molded integrally with the end surface coating portion. As a mode of a core part for a reactor according to the present invention, moreover, the coil includes a pair of coil elements and the stacked columnar body is disposed on an inside of one of the pair of coil elements. Examples include a mode in which the coating resin has the peripheral surface coating portion and the end surface coating portion which coat the stacked columnar body and the following frame-shaped portion. The frame-shaped portion is provided between a portion where both of the coil elements are not disposed in the magnetic core and the end surfaces of both of the coil elements, and is molded integrally with the end surface coating portion.

With the mode, the portion where both of the coil elements are disposed in the magnetic core, that is, the inner core is integrated by the costing resin, and furthermore, the frame-shaped portion provided between the portion where the coil is not disposed, that is, the outer core and the end surfaces of both of the coil elements is also integrated. Consequently, the number of parts is small and the number of reactor assembling steps can be reduced. Accordingly, the reactor according to the above mode has high assembling workability and the core part for the reactor according to the above mode can contribute to the enhancement in the assembling workability of the reactor. With the mode, moreover, the frame-shaped portion is provided. Therefore, it is possible to enhance insulation performance between the portion where the coil is not disposed, that is, the outer core and both of the coil elements.

Examples of a mode including the frame-shaped portion include a mode in which the end surface coating portion coats only a part of one end surface of the stacked columnar body and the other portion of the one end surface is exposed from the coating resin, and the frame-shaped portion includes the end surface coating portion and the following through hole. The other of the pair of inner cores is inserted in the through hole or another stacked columnar body disposed on the inside of the other coil element in the pair of coil elements is inserted therein.

With the mode, there is provided the through hole in which the separate inner core (stacked columnar body) from the inner core (stacked columnar body) integrated with the frame-shaped portion is inserted. Consequently, it is possible to easily position the separate inner core (stacked columnar body) from the inner core (stacked columnar body) integrated with the frame-shaped portion. With the mode, accordingly, two inner cores (stacked columnar bodies) can be positioned with high accuracy with respect to each of the coil elements. Thus, high assembling workability can be obtained.

An aspect of the present invention includes a mode in which the peripheral surface coating portion includes a base coating portion having a tapered shape with a small thickness from one end surface side toward the other end surface side in the stacked columnar body provided with the end surface coating portion and a rib protruded from a surface of the base coating portion and extended in an axial direction of the stacked columnar body. A protrusion height of the rib is increased from the one end surface side toward the other end surface side in the stacked columnar body provided with the end surface coating portion.

The mode can be manufactured by using a bottomed cylindrical metal mold for molding of the coating resin to house the core piece or the gap member such that one end side of the stacked columnar body is positioned on the opening side of the metal mold and the other end side is positioned on the bottom surface side of the metal mold, and to fill and properly cure resin. By using the manufacturing method, a thick side in the base coating portion is positioned on the opening side. Therefore, a compact can easily be pulled out and high mold release performance can be obtained. With the mode, in the case in which the stacked columnar body is set to be the inner core, for example, the rib is provided so that a contact area with the coil is small and insertion performance into the coil is high. Consequently, high assembling workability can be obtained. Furthermore, the coil can be supported by the rib extended in the axial direction of the stacked columnar body, and insulation performance between the coil and the inner core can be enhanced with the mode.

An aspect of the present invention includes a mode in which the gap member is made of a mixture containing magnetic powder and a non-magnetic material.

With the mode, a leakage flux which might occur in the gap member portion can be reduced more effectively as compared with a gap member made of a material containing no magnetic powder so that a reactor having a low loss can be obtained.

The reactor according to the present invention can be preferably used in components of a converter. A converter according to the present invention includes a switching element, a driving circuit that controls an operation of the switching element, and a reactor that smoothens a switching operation, and serves to convert an input voltage by the operation of the switching element, and examples include a mode in which the reactor is the reactor according to the present invention. The converter according to the present invention can be preferably used in components of a power conversion device. The power conversion device according to the present invention includes a converter that converts an input voltage, and an inverter that is connected to the converter and performs conversion between direct current and alternating current, and serves to drive a load with a power converted by the inverter. Examples include a mode in which the converter is the converter according to the present invention.

Since the converter and the power conversion device according to the present invention include the reactor according to the present invention which has high assembling workability, they have high productivity and can be preferably used for on-vehicle parts or the like.

Advantageous Effects of Invention

The reactor according to the present invention has high assembling workability. The core parts for the reactor according to the present invention have high dimensional accuracy and can contribute to enhancement in the assembling workability of the reactor.

DESCRIPTION OF EMBODIMENTS

Figure 1:
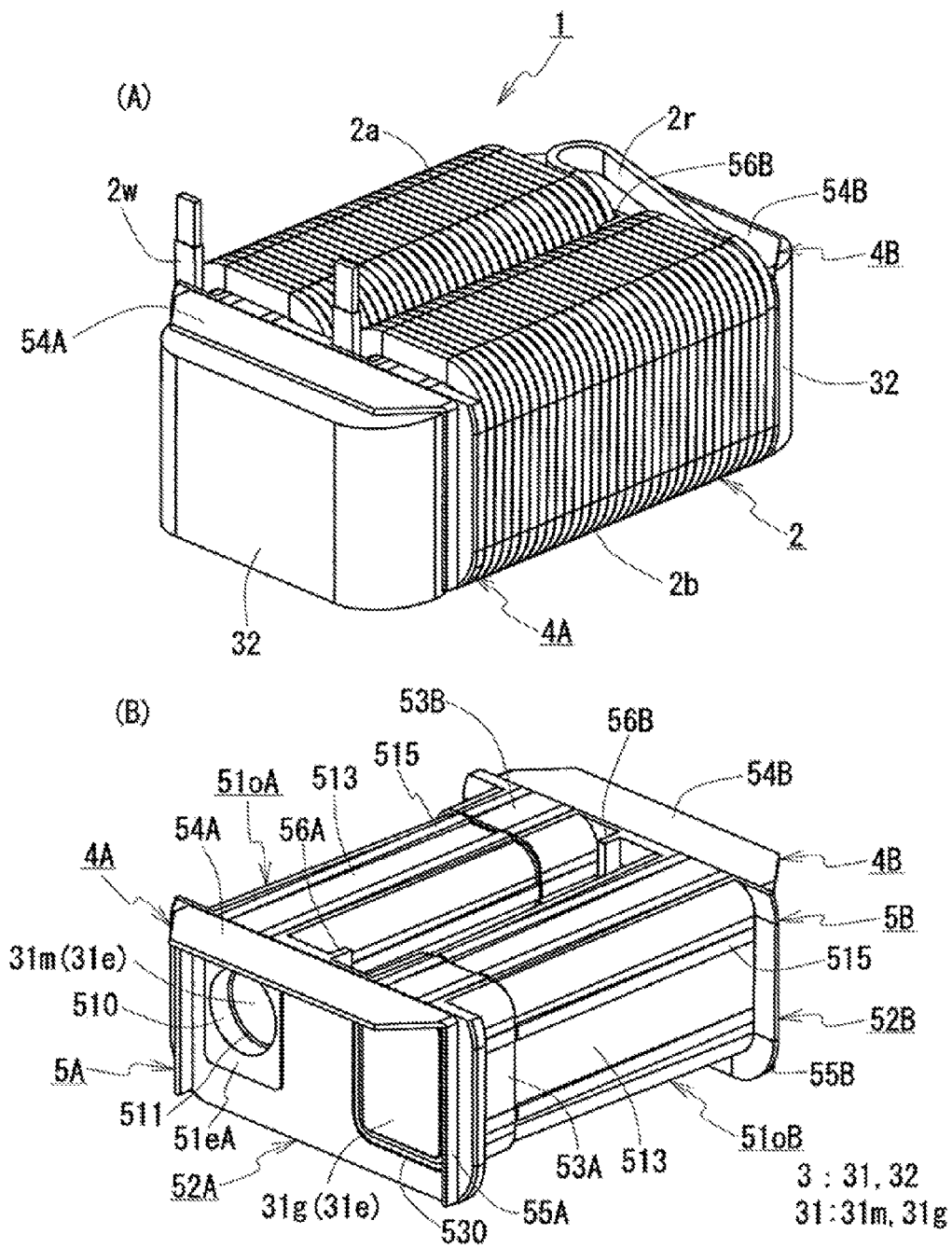
FIG. 1(A) is a brief perspective view showing a reactor according to a first embodiment and FIG. 1(B) is a brief perspective view showing a state in which a pair of core parts provided in the reactor is combined.

A reactor according to embodiments will be described below with reference to the drawings. In the drawings, the same reference numerals denote the same members.

First Embodiment (Whole Structure of Reactor)

Figure 2:
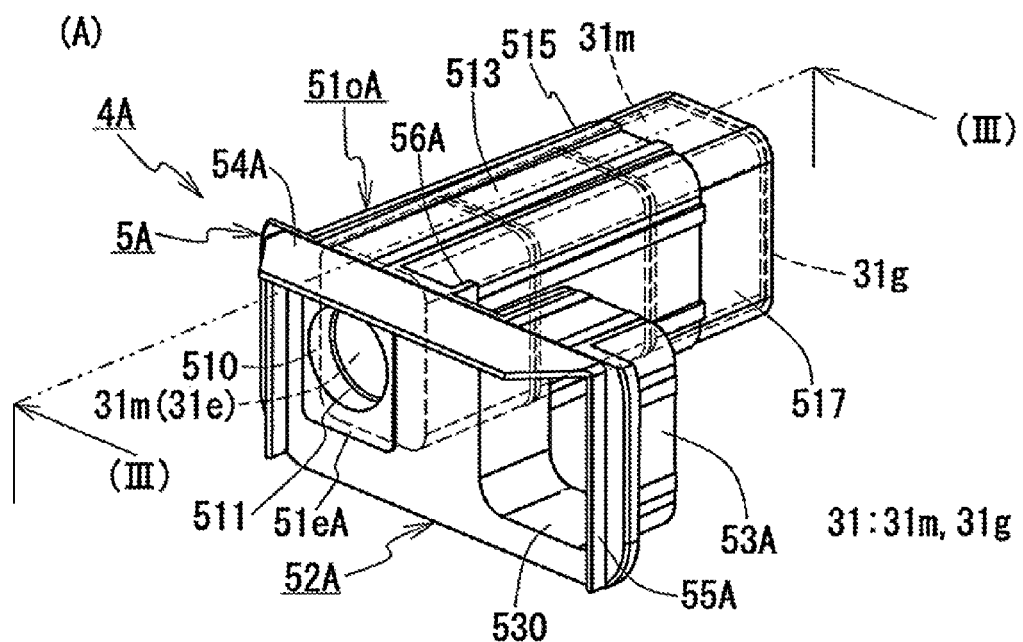
FIG. 2(A) is a brief perspective view showing one of the core parts provided in the reactor according to the first embodiment and FIG. 2(B) is a brief perspective view showing the other core part.
Figure 2:
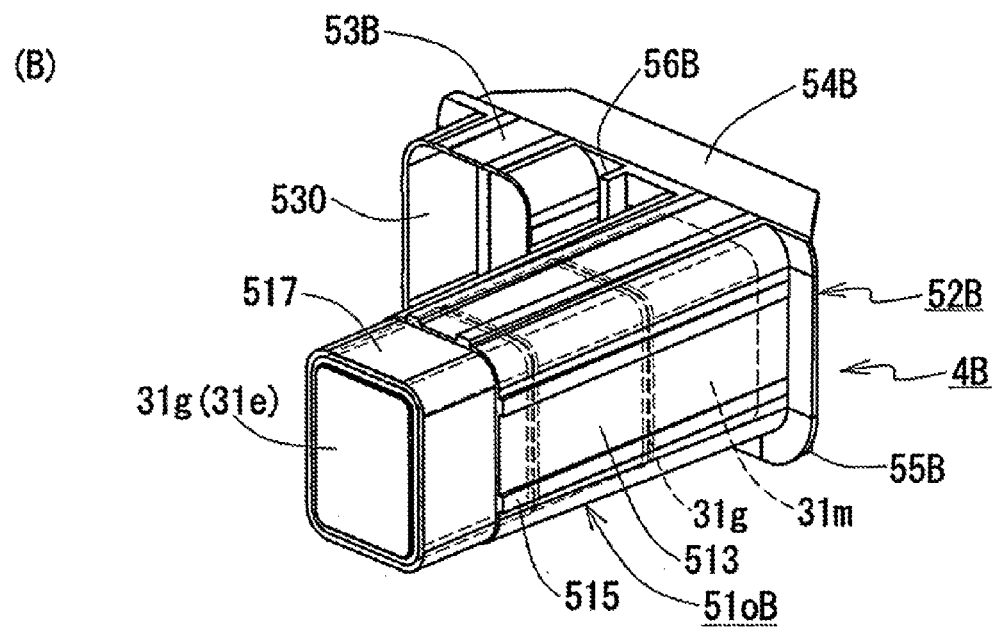
Figure 3:
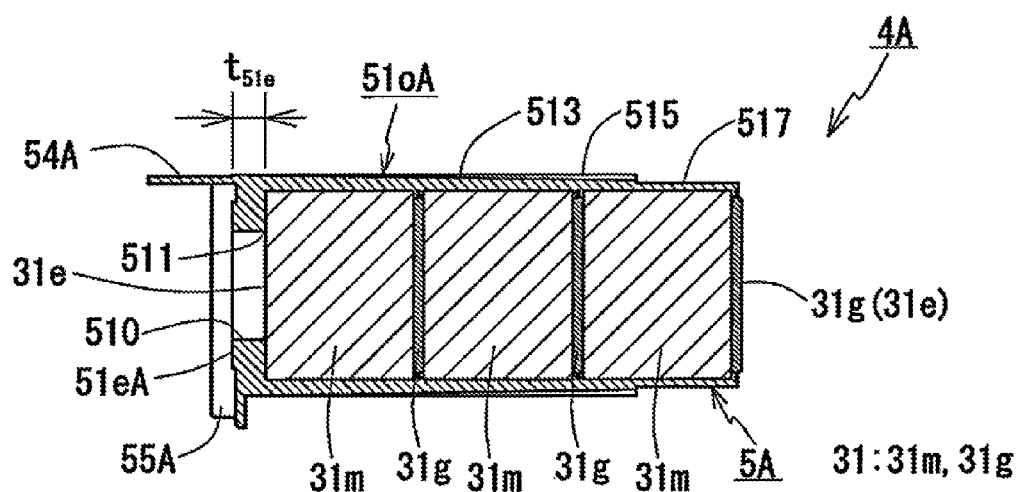
FIG. 3 is a sectional view taken along (III)-(III) of the core part illustrated in FIG. 2A.

With reference to FIGS. 1 to 4, a reactor 1 according to a first embodiment will be described. The reactor 1 includes a coil 2 having a pair of coil elements 2a and 2b and a magnetic core 3 where the coil 2 is arranged. The magnetic core 3 is a ring-shaped body that includes a pair of columnar inner cores 31 disposed respectively on an inside of the coil elements 2a and 2b and a pair of columnar outer cores 32 at which the coil elements 2a and 2b are not disposed and which are provided to interpose both of the inner cores 31 arranged side by side. Each of the inner cores 31 is formed by a stacked columnar body in which a plurality of core pieces 31m and a plurality of gap members 31g are alternately stacked (FIG. 3).

The reactor 1 has a feature that the reactor 1 includes, as components of the magnetic core 3, compacts molded integrally by coating an outer periphery of the stacked columnar body and a part of one of end surfaces with resin, that is, core parts 4A and 4B. Each structure will be described below in more detail.

(Coil)

The coil 2 includes a pair of coil elements 2a and 2b formed by spirally winding the wire 2w, which is a single continuous wire without a junction portion, and a coupling portion 2r that couples both of the coil elements 2a and 2b. The coil elements 2a and 2b are hollow cylindrical bodies having the same number of coil turns and are arranged side by side (horizontally) such that the axial directions thereof are parallel to each other, an end of the wire 2w is disposed on one of end sides of the coil 2 (a left side of FIG. 1(A)), and the wire 2w is partly bent in a U-like shape at the other end side of the coil 2 (a right side of FIG. 1(A)) so that a coupling portion 2r is formed. With this configuration, both of the coil elements 2a and 2b have the same winding direction.

In addition, it is possible to fabricate each coil element by separate wires, thereby forming a coil in which the ends of the wires of the respective coil elements are bonded to each other through welding, soldering, pressure bonding or the like.

For the wire 2w, it is possible to preferably use a coated wire having an insulating coating made of an insulating material on the outer periphery of a conductor such as a rectangular wire or a circular wire made of a conducting material such as copper, aluminum or an alloy thereof. In this embodiment, there is utilized a coated rectangular wire in which the conductor is made of a copper rectangular wire and the insulating coating is made of enamel (typically, polyamideimide), and each of the coil elements 2a and 2b is an edgewise coil obtained by edgewise winding the coated rectangular wire. Referring to the edgewise coil, it is possible to easily increase a space factor and to reduce a size. Although an end surface shape of each of the coil elements 2a and 2b is set to be a shape obtained by rounding a rectangular corner portion in this embodiment, moreover, it is possible to properly change the end surface shape into a circular shape or the like.

Both ends of the wire 2w disposed at one end side of the coil 2 are properly extended from turn forming portions, and terminal fittings (not shown) are connected to the conductor portions exposed by peeling the insulating coating off. An external device (not shown) such as a power supply for supplying power to the coil 2 is connected through the terminal fittings.

(Core Part)

The reactor 1 includes core parts 4A and 4B configuring the inner core 31 in a part of the magnetic core 3, specifically, portions disposed on an inside of the coil elements 2a and 2b respectively. Both of the core parts 4A and 4B are members having the same shape. Therefore, description will be mainly given by taking the core part 4A as an example. In the drawings, respective components of the core part 4B corresponding to the core part 4A have the same numerals and a designation having B in place of A is used. Furthermore, a state shown in FIG. 2(B) is brought when the core part 4A shown in FIG. 2(A) is rotated by 180° in a horizontal direction, and a state shown in FIG. 2(A) is brought when the core part 4B shown in FIG. 2(B) is rotated by 180° in the horizontal direction.

The core part 4A includes, as main components, a stacked columnar body formed by a plurality of core pieces 31m and a plurality of gap members 31g which configure the inner core 31 in the magnetic core 3, and a coating resin 5A for integrally holding the stacked columnar body. The core part 4A has the greatest feature that it includes a peripheral surface coating portion 51oA for coating an outer peripheral surface of the stacked columnar body and an end surface coating portion 51eA for coating a part of an end surface of the stacked columnar body. In brief, the core part 4A is a member in which the stacked columnar body configuring the inner core 31, a cylindrical bobbin and a frame-shaped bobbin are integrally molded, an end coating portion 51eA is provided on one of opening portions disposed on the frame-shaped bobbin, and the other opening portion directly acts as a through hole (FIG. 2(A)).

[Stacked Columnar Body (Inner Core)]

The stacked columnar body is a stacked body in which the core piece 31m and the gap member 31g are alternately arranged as shown in FIG. 3. Examples of each core piece 31m include a compact using soft magnetic powder represented by an iron group metal such as iron, an alloy thereof or the like, and a stacked body in which a plurality of magnetic thin sheets with insulating coatings (for example, electromagnetic steel sheets represented by silicon steel sheets) is stacked, and a well-known member can be utilized. Examples of the compact include a composite material obtained by performing injection-molding, cast-molding or the like over a mixed body containing a powder magnetic core, a sintered compact and soft magnetic powder, and resin. The compact can have various three-dimensional shapes and has a high degree of freedom of the shape. The powder magnetic core is manufactured by utilizing powder containing an insulating layer (typically, a silicone resin, phosphate or the like) in a surface of the soft magnetic powder and is set to have a mode in which an insulator is present between particles of the soft magnetic powder, thereby enabling a reduction in eddy loss. In this embodiment, each core piece is a powder magnetic core of soft magnetic powder containing iron, such as iron or steel.

The gap member 31g is made of a material with a lower magnetic permeability than that of the core piece 31m and is properly arranged in the ring-shaped magnetic core 3 to adjust an inductance. Examples of a specific material include a non-magnetic material such as alumina, glass epoxy resin or unsaturated polyester, a mixture containing a non-magnetic material such as polyphenylene sulfide (PPS) resin or phenol resin and magnetic powder (soft magnetic powder such as iron powder), and the like. When a gap member made of the mixture is used, a leakage flux of a gap portion can be reduced and a loss caused by the leakage flux can be decreased. This advantage can be obtained more easily with a higher magnetic permeability (or relative magnetic permeability) of the mixture. If the magnetic permeability is excessively high, however, flux saturation might be caused. Accordingly, it is preferable to adjust the material or content of the magnetic powder such that the relative magnetic permeability of the gap member made of the mixture is higher than 1.0 to approximately 1.2. Moreover, the mixture contains resin and can be thus molded easily into a desirable shape by utilizing a proper molding method such as injection-molding or cast-molding, and furthermore, is softer than ceramics such as alumina. Therefore, cutting or the like can also be performed easily so that a gap member having high dimensional accuracy can readily be obtained. In this embodiment, the gap member 31g is constituted by a mixture (a relative permeability of approximately 1.15) containing PPS resin and iron powder.

The shape of the core piece 31m or the gap member 31g can be selected properly such that the stacked columnar body has a desirable external shape. In this embodiment, the core piece 31m has a rectangular-parallelepiped shape (herein, a corner portion is rounded depending on the external shape of the coil element), the gap member 31g has a shape of a rectangular plate, and the stacked columnar body has a rectangular-parallelepiped shape (herein, a corner portion is rounded) obtained by combining them. In addition, the stacked columnar body can have various shapes such as a cylindrical shape.

In this embodiment, the gap member 31g is a plate member having a shape of a step by cutting an outer peripheral edge region (an upper region and a lower region in FIG. 3) like a frame on a surface and a back face which are opposed to each other as shown in FIG. 3. For this reason, the outer peripheral edge portion of the gap member 31*g* has a small thickness and a central portion thereof has a great thickness. Moreover, an area of the central portion on the opposed surface and back face is smaller than that of the end surface of the core piece 31*m*, and a contour area surrounded by the outer peripheral edge (an area of a portion including the outer peripheral edge region having the small thickness) is larger than that of the central portion and is almost equal to a size of the end surface of the core piece 31*m*. Accordingly, the gap member 31*g* in the stacked columnar body is not substantially protruded from the outer periphery of the core piece 31*m*. Due to this shape, a gap is formed between the outer peripheral edge region having the small thickness and the end surface of the core piece 31*m* and is filled with resin constituting the coating resin 5A when the gap member 31*g* is interposed between the core pieces 31*m*.

The shape and size (the thickness and area) of the gap member 31*g* can be selected properly and are not restricted to the mode described above. For example, it is also possible to use a flat plate having no protruded portion and a uniform thickness, to cause a maximum area of the flat plate to be smaller than, equal to or larger than that of the end surface of the core piece 31*m*. Moreover, a planar shape of the flat plate may be a shape other than a rectangular shape, for example, a circular shape or a polygonal shape. If the gap member 31*g* is constituted by the mixture, a proper molding method can be utilized as described above. The molding can easily be performed into a complicated shape or a shape or a dimension can readily be adjusted by cutting or the like after the molding. If the shape of the flat plate (including the case in which a partial thickness is varied) is taken as in the gap member 31*g* according to this example, it is possible to easily carry out stacking and to obtain high assembling workability.

It is possible to properly select the number of the core pieces or the gap members such that the reactor 1 has a desirable inductance. Moreover, stacking order of the core piece 31*m* and the gap member 31*g* can also be selected properly, and both ends of the stacked columnar body may be the core piece 31*m* or the gap member 31*g* or one of the ends of the stacked columnar body may be the core piece 31*m* and the other end may be the gap member 31*g* as in this example. In the case in which at least one of the ends of the stacked columnar body is the gap member 31*g* and an end surface coating portion 51*e*A is provided on the gap member 31*g*, a gap length at one end side is obtained as a total thickness of the gap member 31*g* and the end surface coating portion 51*e*A. In the case in which at least one end of the stacked columnar body is the core piece 31*m* and the end surface coating portion 51*e*A is provided on the core piece 31*m* as in this example, the gap length on the one end side is equal to a thickness of only the end surface coating portion 51*e*A.

The core piece 31*m* and the gap member 31*g* can be integrated with an adhesive or the like. For the adhesive, it is possible to utilize a proper adhesive, for example, a thermosetting type such as an epoxy-based adhesive, a normal temperature curing type such as a cyanoacrylate-based adhesive, or the like. In the present invention, the core piece 31*m* and the gap member 31*g* are held integrally with the coating resin 5A. For this reason, the adhesive can be omitted. Alternatively, the adhesive can be utilized as a temporary fixing member until the coating resin 5A is molded. By performing the temporary fixation, it is possible to treat the stacked columnar body as an integral product.

Therefore, the stacked columnar body can easily be stored in a metal mold so that high workability can be obtained.

[Coating Resin]

The coating resin 5A will be mainly described with reference to FIGS. 2 and 3. The coating resin 5A includes the peripheral surface coating portion 51*o*A for coating a whole periphery over an almost whole length in a stacking direction thereof and the end surface coating portion 51*e*A for coating a part of one of the end surfaces of the stacked columnar body in the stacked columnar body (the inner core 31) of the core piece 31*m* and the gap member 31*g* as shown in FIG. 2(A), and both of the coating portions 51*o*A and 51*e*A are molded integrally.

The peripheral surface coating portion 51*o*A mainly has a function for fixing and integrating mutual positions of the core piece 31*m* and the gap member 31*g* and a function for enhancing insulation performance of the coil element 2*a* (FIG. 1(A)) and the inner core 31. In this example, as described above, the gap member 31*g* is set to have a specific shape so that a contact area of the core piece 31*m*, the gap member 31*g* and the coating resin 5A is sufficiently large and the resin constituting the coating resin 5A is fully provided between both of them as shown in FIG. 3. Consequently, both of them can be held strongly.

If the core piece 31*m* and the gap member 31*g* can be held integrally, a coating region of the peripheral surface coating portion 51*o*A can be selected properly. For example, it is possible to obtain a mode in which a part of the outer peripheral surface of the core piece 31*m* is exposed from the peripheral surface coating portion 51*o*A. As in this example, a mode for substantially coating the whole outer peripheral surface of the stacked columnar body has advantages: (1) the bonding strength of the core piece 31*m* and the gap member 31*g* is increased so that both of them slip from each other with difficulty, (2) insulation performance between the coil 2 and the stacked columnar body (mainly the core piece 31*m*) is enhanced, (3) mold release performance from a metal mold is high, and (4) the stacked columnar body can be protected. In this embodiment, the gap member 31*g* configuring the other end surface of the staked columnar body is slightly protruded from the peripheral surface coating portion 51*o*A (FIG. 3).

The thickness of the peripheral surface coating portion 51*o*A can be selected properly, and a uniform thickness can be obtained wholly, for example. In this embodiment, the peripheral surface coating portion 51*o*A includes a region having a small thickness from one end surface side provided with the end surface coating portion 51*e*A in the stacked columnar body toward the other end surface side from which the gap member 31 is exposed and a region which is provided continuously to the region and has a uniform thickness up to the other end surface and a small thickness. In other words, the peripheral surface coating portion 51*o*A includes a region having a tapered external shape and a flat thin region.

The region having the tapered shape includes a base coating portion 513 forming a tapered external shape and a rib 515 protruded from a surface of the base coating portion 513 and extended in an axial direction of the stacked columnar body. The base coating portion 513 has a thickness reduced gradually from one end side (a left side in FIG. 3) toward the other end side (a right side in FIG. 3) over a whole length thereof as shown in FIG. 3. The rib 515 is provided continuously on a straight line over the whole length of the base coating portion 513 and a protrusion height from the surface of the base coating portion 513 is increased gradually from one end side toward the other end side. However, a protrusion height from the surface (the outer peripheral surface) of the stacked columnar body (the core piece 31m) in the rib 515 is constant. In a state in which the coil element 2a is supported by the rib 515, accordingly, a distance between the stacked columnar body (the core piece 31m) and the coil element 2a is uniform over the whole length in a circumferential direction of an inner peripheral surface of the coil element 2a.

It is possible to properly select a sectional shape of the rib 515, the number of the ribs 515 and a formation region for the base coating portion 513. In this embodiment, the rib 515 has a rectangular section and a rectangular-parallelepiped shape provided continuously over the whole length of the base coating portion 513. The plurality of ribs 515 having this shape are arranged side by side on the surface of the base coating portion 513 (FIG. 2). In this embodiment, two ribs 515 are provided on each of four surfaces forming the base coating portion 513 having the rectangular-parallelepiped shape, that is, eight ribs 515 in total are provided. According to this mode, the contact area with the coil 2 can be reduced, insertion performance to the coil 2 is high, and furthermore, a predetermined distance can be ensured between the coil 2 and the stacked columnar body (particularly, the core piece 31m) so that their insulation performance can be enhanced. In place of the continuous linear rib 515, for example, it is possible to take a mode in which a plurality of independent projections is disposed linearly, a mode in which a plurality of discontinuous projections are not linear but are scattered, or the like.

The thin region functions as an engaging portion 517 in which an engaging tube portion 53B (FIG. 2(B)) provided in another core part 4B to be assembled into a core part 4A is fitted. By the fitting of the engaging portion 517 and the engaging tube portions 53A and 53B, the core parts 4A and 4B are assembled with high accuracy. In this embodiment, the same ribs as the rib 515 are provided on outer peripheries of the engaging tube portions 53A and 53B. A thickness of the engaging portion 517 is adjusted such that maximum protrusion heights of the ribs in the engaging portion 517 of the core part 4A and the engaging tube portion 53B of the core part 4B are equal to each other when both of them are combined.

The end surface coating portion 51eA is formed on one end surface of the stacked columnar body and functions as a gap. In the present invention, particularly, the end surface coating portion 51eA has an integral structure with the peripheral surface coating portion 51oA. Consequently, it is possible to determine a thickness of the end surface coating portion 51eA depending on a metal mold to be used for molding of the coating resin 5A while integrating the core piece 31m and the gap member 31g in the molding. Even if the core piece 31m or the gap member 31g has a manufacturing error, therefore, it is possible to absorb the manufacturing error, thereby molding the core part 4A having a predetermined length by adjusting the thickness of the end surface coating portion 51eA in the molding of the coating resin 5A. Accordingly, the core part 4A has high dimensional accuracy and is appropriately assembled into the outer core 32 (FIG. 1(A)).

A thickness t51e of the end surface coating portion 51eA can be selected properly. The end surface coating portion 51eA functions as a gap. Although the thickness of the end surface coating portion 51eA may be set to be substantially equal to that of the gap member 31g, therefore, it is increased to some degree. For example, if the thickness is greater than 4 mm, it is possible to ensure a great absorption margin of the manufacturing error. If the thickness is excessively great, however, a leakage flux of a gap portion is increased. Therefore, the thickness of the end surface coating portion 51eA is greater than 4 mm and approximately 6 mm or less as an example.

A planar shape of the end surface coating portion 51eA can be selected properly. In this embodiment, the planar shape is rectangular and a cylindrical hollow hole 510 is provided on a center. The end surface of the stacked columnar body (herein, the core piece 31m forming the end surface 31e of the inner core 31) is exposed from the hollow hole 510. In other words, a bottom surface of the hollow hole 510 is configured by the end surface of the stacked columnar body. The hollow hole 510 can be utilized as a region for filling an adhesive for bonding the end surface 31e of the inner core 31 to the outer core 32 (FIG. 1(A)), for example.

The shape, size, number and formation position of the hollow hole 510 can be selected properly. In this embodiment, a sectional area on an opening side in the hollow hole 510 is different from a sectional area on the stacked columnar body side, and an inclined portion 511 is provided such that a sectional area is gradually reduced toward the end surface of the stacked columnar body in a region on the stacked columnar body side. Although the end surface coating portion 51eA takes a mode including the single hollow hole 510 on the center in this embodiment, moreover, it is possible to take a mode including a plurality of hollow holes 510 or a mode having no hollow hole 510 and coating the whole end surface of the stacked columnar body.

The hollow hole 510 is formed by a support member for supporting one end surface of the stacked columnar body in the molding of the coating resin 5A as will be described below. Accordingly, the shape, size and number of the support member which will be described below are selected such that the hollow hole 510 has the desirable shape, size and number.

In this embodiment, furthermore, the coating resin 5A integrally includes a frame-shaped portion 52A. The frame-shaped portion 52A is provided between the end surfaces of the coil elements 2a and 2b (FIG. 1(A)) and an inner end surface 32e (FIG. 4) of the outer core 32 disposed opposite to the end surface 31e of the inner core 31 (the stacked columnar body provided in the coil parts 4A and 4B) in the coil elements 2a and 2b respectively, and has a function for mainly enhancing insulation performance of both of them.

In this embodiment, the frame-shaped portion 52A has a rectangular frame shape which is similar to external shapes made by the coil elements 2a and 2b provided side by side. The peripheral surface coating portion 51oA is coupled, and furthermore, the end surface coating portion 51eA is integrated and the hollow hole 510 is provided on a surface disposed at the coil 2 side in the frame-shaped portion 52A, that is, a side where the coil element 2a is disposed, and the engaging tube portion 53A is coupled and a through hole 530 communicating with the surface and back face of the frame-shaped portion 52A (the surface on the coil 2 side and the surface on the outer core 32 side) is provided at a side where the coil element 2b is disposed.

The engaging portion 517 (FIG. 2(B)) in another core part 4B is fitted in the through hole 530 to position both of the core parts 4A and 4B each other as shown in FIG. 1(B). For this reason, it is possible to properly position the inner core 31 (the stacked columnar body) with respect to the coil elements 2a and 2b disposed on the outer peripheries of the peripheral surface coating portions 51oA and 51oB respectively.

In this embodiment, a length of the engaging tube portion 53A is set to be substantially equal to that of the engaging portion 517. In the same manner as the base coating portion 513 of the peripheral surface coating portion 51oA, moreover, the engaging tube portion 53A is formed by a tube having a taper shape with a thickness reduced gradually from the frame-shaped portion 52A side toward the peripheral edge of the engaging tube portion 53A, and includes a plurality of ribs protruded from the tapered surface. The rib provided in the engaging tube portion 53A also has a protrusion height reduced gradually toward the frame-shaped portion 52A side in the same manner as the rib 515 of the peripheral surface coating portion 51oA. The position and protrusion height of the rib of the engaging tube portion 53A and the tapered surface are adjusted to have coupling to the rib 515 provided on the peripheral surface coating portion 51oB of another core part 4B as shown in FIG. 1(B) when both of the core parts 4A and 4B are assembled.

In addition, the frame-shaped portion 52A integrally includes a mount 54A on which the coupling portion 2r of the coil 2 is mounted, a positioning portion 55A of the outer core 32, and a partition 56A provided between the coil elements 2a and 2b.

The mount 54A is a flat plate-shaped member which is protruded outward from the surface disposed on the outer core 32 side in the frame-shaped portion 52A and is arranged to coat a part of one surface (herein, an upper surface) of the outer core 32 assembled to the core part 4A as shown in FIG. 1(A). One of mounts (herein, a mount 54B) in two core parts 4A and 4B provided in the reactor 1 is provided between the coupling portion 2r and one of the surfaces of the outer core 32 to enhance their insulation performance.

The positioning portion 55A is a member which is protruded outward from the surface disposed on the outer core 32 side in the frame-shaped portion 52A and is utilized for positioning the outer core 32. In this embodiment, the positioning portion 55A is formed by a pair of strip portions for interposing a side surface of the outer core 32 (herein, a surface connected to an upper surface where the mount 54A is mounted and arranged in an axial direction of the coil 2). The strip portion is provided continuously to the mount 54A. Accordingly, a U-shaped protrusion is provided on the surface at the outer core 32 side in the frame-shaped portion 52A, and a part thereof acts as the mount 54A and the other part acts as the positioning portion 55A. A shape of the positioning portion 55A can be selected properly and a small projection or the like may be taken.

The partition 56A is a member which is protruded inward (the coil 2 side) from the surface disposed on the coil 2 side in the frame-shaped portion 52A and is provided between the coil elements 2a and 2b assembled to the core parts 4A and 4B, and serves to hold both of the elements 2a and 2b in a non-contact state. It is possible to properly select the shape or size of the partition 56A (a length in the axial direction of the coil, a length in an orthogonal direction to both the axial direction of the coil and a horizontal direction of the coil elements 2a and 2b or the like). In this embodiment, the partition 56A is set to be a strip body disposed in the axial direction of the coil 2 and has such a size as to be disposed in only a part between the coil elements 2a and 2b.

The core part 4A can take a mode in which at least one of the engaging tube portion 53A, the mount 54A, the positioning portion 55A and the partition 56A is omitted. By including all of them as in this example, it is possible to enhance assembling workability of the core parts 4A and 4B, insulation performance of the coil 2 and the magnetic core 3, insulation performance between the coil elements 2a and 2b and assembling workability of the core parts 4A and 4B and the outer core 32.

In this embodiment, moreover, the surface disposed on the coil 2 side in the frame-shaped portion 52A has an inclined shape corresponding to the end surface shapes of the coil elements 2a and 2b (a shape in which a thickness is varied in a circumferential direction of the peripheral surface coating portion 51oA). When the coil elements 2a and 2b are interposed between the frame-shaped portions 52A and 52B, accordingly, the end surfaces of both of the elements 2a and 2b are positioned along the surfaces at the coil 2 side of the frame-shaped portions 52A and 52B so that a clearance is generated between the end surfaces of both of the elements 2a and 2b and the surfaces at the coil 2 side of the frame-shaped portions 52A and 52B with difficulty. As a result, a length of a combination of the coil 2 and the core parts 4A and 4B (herein, a length in the axial direction of the coil 2 in the combination) can be shortened so that the size of the reactor 1 can be reduced.

Examples of a material of the coating resin 5A include thermoplastic resin such as PPS resin, polytetrafluoroethylene (PTFE) resin, liquid crystal polymer (LCP), nylon 6, nylon 66 or polybutylene terephthalate (PBT) resin. In this embodiment, the material of the coating resin 5A is set to be the PPS resin.

[Method of Manufacturing Core Part]

The core part 4A having the structure can be typically manufactured by insert molding with the stacked columnar body as a core. Specifically, there are used a first metal mold having a bottomed cylindrical shape and a second metal mold having a flat plate shape which is disposed to close an opening portion of the bottomed cylindrical metal mold, for example. In a state in which the stacked columnar body is stored in the first metal mold having the bottomed cylindrical shape and both end surfaces of the stacked columnar body are supported by the first metal mold and the second metal mold, both of the metal molds are filled with desirable resin to coat an almost whole peripheral surface of the stacked columnar body and a part of one end surface so that the core part 4A is obtained.

It is possible to properly select a storage direction of the stacked columnar body with respect to the first metal mold having the bottomed cylindrical shape. Typically, examples include a mode in which the stacked columnar body is stored with an outer peripheral surface opposed to a bottom face of the first metal mold (which will be hereinafter referred to as a horizontal type storage mode) and a mode in which the stacked columnar body is stored with one end surface opposed to the bottom face of the first metal mold (which will be hereinafter referred to as a vertical storage mode). The vertical storage mode has advantages: (1) a stacking state can easily be maintained also in the case in which the stacked columnar body is not (temporarily) integrated with an adhesive, (2) the end surface of the stacked columnar body can be supported by the bottom face of the first metal mold and a support structure can simply be obtained, and (3) the coating region in the peripheral surface coating portion 51oA can easily be taken largely and the exposed region of the core piece 31m can be reduced. In the vertical storage mode, moreover, in the case in which the base coating portion 513 configuring the peripheral surface coating portion 51oA has the tapered external shape, and furthermore, the rib 515 is provided as described above, by using a metal mold (having an inclined surface or a groove) which can mold the taper shape or the rib 515, it is possible to easily pull the molded core part 4A out of the metal mold.

In the case in which the vertical storage mode is used, the following can be used as the second metal mold in order to support one end surface of the stacked columnar body, for example. More specifically, there is used a metal mold having a rib having a proper shape (herein, a cylindrical shape) for forming the end surface coating portion 51eA or including a bar-shaped body having a proper shape for forming the end surface coating portion 51eA and a plate-shaped metal mold having a through hole capable of inserting the bar-shaped body therein and holding the bar-shaped body inserted in the through hole forward and backward movably. In a mode in which the forward and backward movable bar-shaped body in the latter case is provided, it is possible to pull out the bar-shaped body in an optional period of time. For example, when the bar-shaped body is pulled out before the filled resin is perfectly cured, a core part coating the whole end surface of the stacked columnar body can be formed or a depth of the hollow hole can be adjusted.

In this embodiment, the first metal mold having the bottomed cylindrical shape and the second metal mold including the cylindrical projection are utilized to mold the core parts 4A and 4B by the vertical storage mode. The bottom face of the first metal mold forms a step groove capable of holding a part of a surface side portion and an outer peripheral edge portion in the gap member 31g positioned on the end surface of the stacked columnar body. A portion fitted in the step groove in the gap member 31g is protruded from the peripheral surface coating portion 51oA as described above. Moreover, there is used an end surface side region of a cylindrical projection provided in the second metal mold and having a tapered shape toward the end surface, and the inclined portion 511 is thus formed. By the tapered shape, the projection can easily be pulled out and high mold release performance can be obtained.

First of all, the gap member 31g and the core piece 31m are alternatively stored in the first metal mold. The integrated product fixed (temporarily) with the adhesive or the like may be stored as described above. Next, the projection of the second metal mold is properly pushed against the core piece 31m disposed on the opening side of the first metal mold to support the stacked product which is stored. At this time, the position of the projection is adjusted such that a distance between the projection of the second metal mold and the bottom face of the first metal mold has predetermined lengths of the core parts 4A and 4B. In this embodiment, a core for forming the through hole 530 of the engaging tube portions 53A and 53B is arranged properly. Desirable resin is filled in a space formed by both of the metal molds in the support state and is cured appropriately, and is pulled out of the metal mold so that the core parts 4A and 4B can be molded. The hollow hole 510 corresponding to the external shape of the projection of the second metal mold is formed on the core parts 4A and 4B thus obtained.

(Outer Core)

Figure 4:
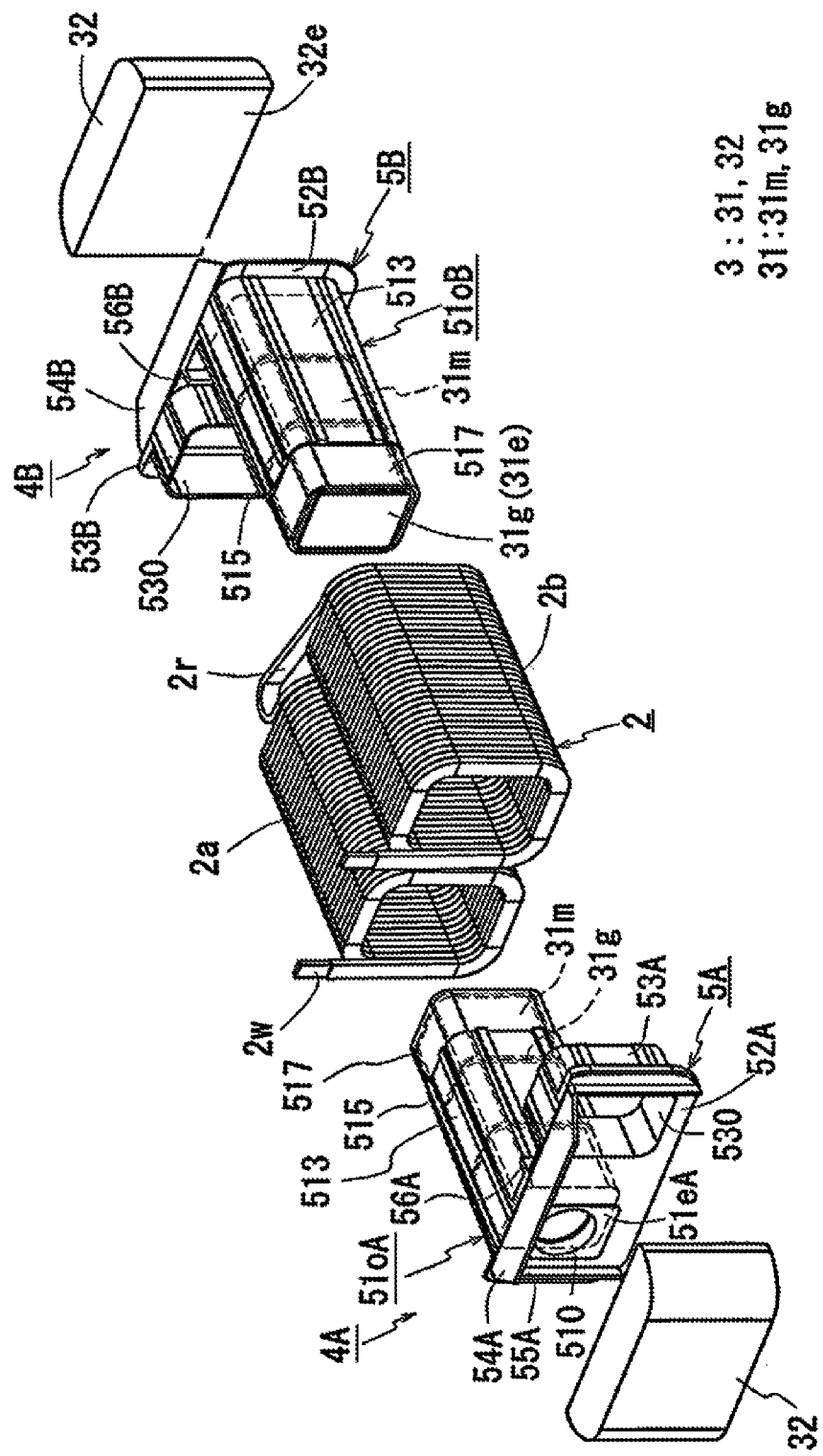
FIG. 4 is an exploded perspective view showing the reactor according to the first embodiment.

In this embodiment, the outer core 32 assembled into the core parts 4A and 4B is a columnar body in which the inner end surface 32e to be an opposed surface to the coil elements 2a and 2b is formed by a uniform plane and two parallel surfaces coupled to the inner end surface 32e have a trapezoidal shape (FIG. 1(A) and FIG. 4). Although an oblique side of the trapezoid has a curved shape in this embodiment, the oblique side may be linear. In this embodiment, furthermore, the outer core 32 is set to be a powder magnetic core in the same manner as the core piece 31m.

The ring-shaped magnetic core 3 is formed by the inner core 31 (the stacked columnar body) provided in the core parts 4A and 4B and the pair of outer cores 32, and the magnetic core 3 forms a closed magnetic circuit when the coil 2 is energized.

In addition, a surface on an installation side of the outer core 32 (the lower surface in FIG. 1(A)) is protruded from a surface (the lower surface in FIG. 1(A)) on an installation side of the inner core 31 (the stacked columnar body) and is flush with a surface (the lower surface in FIG. 1(A)) on the installation side of the coil 2. Accordingly, the reactor 1 has high stability because an installation surface is formed by both of the coil elements 2a and 2b and the outer core 32 and an installation area is large. Moreover, the outer core 32 is also a powder magnetic core. Therefore, a portion protruded from the inner core 31 in the outer core 32 can be utilized for a passage of a magnetic flux or a heat radiation path.

(Other Components)

Although the reactor 1 having the structure described above can be utilized as it is, furthermore, it can be stored in a bottomed cylindrical case (moreover, which may have a cover), sealing resin can be filled in the case or the surface of the reactor 1 can be covered with another resin (which will be referred to as outer resin). The reactor including the case or the outer resin can carry out mechanical protection of the coil 2 and the magnetic core 3, protection from an environment, enhancement in handling performance or the like. The reactor including sealing resin or outer resin can cause the hollow hole 510 provided on the end surface coating portion 51eA to be a filling space for the sealing resin or the outer resin, and the inner core 31 and the outer core 32 can be bonded to each other with the resin.

If the case is made of a light metal such as aluminum or an alloy thereof, or magnesium or an alloy thereof, it has a high thermal conductivity and a light weight. If there is employed a case in which a bottom portion and a side wall portion erected on the bottom portion are set to be separate members and different kinds of materials are used, that is, the bottom portion is made of the metal described above and the side wall portion is made of resin such as the PPS resin, the bottom portion provided with the coil 2 has high heat-release performance and can have a weight reduced. Examples of the sealing resin include epoxy resin, urethane resin, silicone resin and the like. By using, as the sealing resin, resin containing a filler made of at least one of ceramics selected from silicon nitride, aluminum (alumina) oxide, aluminum nitride, boron nitride, mullite and silicon carbide, high insulation performance can be obtained and heat-release performance can also be enhanced.

In addition, if there is employed a mode in which a heat radiation plate made of the metal described above, the ceramics having high thermal conductivity or the like is fixed with an adhesive, a bolt, outer resin or the like, the heat-release performance can be enhanced.

(Method of Manufacturing Reactor)

The reactor 1 having the structure can be manufactured in accordance with a process of preparation of a coil, preparation of a core part and assembling, for example.

Specifically, the coil 2, the core piece 31m and the gap member 31g for configuring the inner core 31 (the stacked columnar body) and the core piece for configuring the outer core 32 are first prepared as described above.

As described above, the core parts 4A and 4B are molded by the insert molding. In this embodiment, the core parts 4A and 4B have the same shape. Therefore, the core parts 4A and 4B can be manufactured by a single metal mold and have high productivity.

Next, the coil 2, the core parts 4A and 4B and the outer core 32 are assembled. As shown in FIG. 4, the stacked columnar body coated with the peripheral surface coating portion 51oA, that is, the inner core 31 is inserted into the coil element 2a in the core part 4A and the stacked columnar body coated with the peripheral surface coating portion 51oB, that is, the inner core 31 is inserted into the other coil element 2b in the other core part 4B. The core parts 4A and 4B include the engaging tube portions 53A and 53B and the engaging portion 517 so that fitting can easily be performed with high accuracy. In the core parts 4A and 4B, moreover, the surfaces on the coil 2 side of the frame-shaped portions 52A and 52B are provided along the end surface shapes of the coil elements 2a and 2b. Consequently, the coil 2 and the core parts 4A and 4B can be combined with high accuracy.

In addition, the outer core 32 is disposed to interpose the frame-shaped portion 52A in the core part 4A and the frame-shaped portion 52B in the other core part 4B, and the inner core 31 and the outer core 32 are formed to have a ring shape. Thus, the reactor 1 is obtained. As described above, an adhesive or the like may be filled in the hollow hole 510 of the end surface coating portion 51eA of the core part 4A and the hollow hole of the end surface coating portion of the core part 4B, and furthermore, an adhesive or the like may be applied to the end surface 31e of the inner core 31 exposed from the through hole 530 of the core parts 4A and 4B to bond the inner core 31 to the outer core 32.

With the mode including the case, the sealing resin or the like as described above, furthermore, storage in a case, filling of sealing resin, formation of outer resin, bonding of a heat radiation plate or the like is carried out.

(Purpose of Use)

The reactor 1 having the structure can be preferably used for a particular purpose of use under electricity application conditions in which maximum current (direct current) is in a range from about 100 to 1000 A, an average voltage is in a range from about 100 to 1000 V, and a usable frequency is in a range from about 5 to 100 kHz, or typically, a component of an on-vehicle power conversion device in a vehicle such as an electric vehicle, a hybrid electric vehicle, or the like.

(Effect)

Even if the core piece 31m or the gap member 31g configuring a part of the magnetic core 3 (herein, the inner core 31) has a manufacturing error, the reactor 1 adjusts the thickness of the end surface coating portion in the coating resin 5A and 5B provided in both of the core parts 4A and 4B in the molding, thereby enabling absorption of the manufacturing error through the end surface coating portions 51eA and 51eB. Accordingly, the core parts 4A and 4B to be the components of the reactor 1 have high dimensional accuracy because a length in a stacking direction of a stacked product obtained by the core piece 31m and the gap member 31g is defined by the metal mold. For this reason, the outer core 32 is properly assembled into the core parts 4A and 4B without additional adjustment of the thickness of the adhesive or the like.

Moreover, the reactor 1 causes the end surface coating portions 51eA and 51eB provided in both of the core parts 4A and 4B to function as gaps, thereby enabling a reduction in the number of the gap members 31g to be prepared additionally, a reduction in the number of steps, and a reduction or omission of processing for enhancing the dimensional accuracy in the gap member 31g.

In addition, the reactor 1 can treat the stacked product of the core piece 31m and the gap member 31g as an integrated product held integrally by the peripheral surface coating portions 51oA and 51oB, thereby enabling omission of an independent cylindrical bobbin and a reduction in the number of parts and the number of assembling steps.

In these respects, the reactor 1 has high the assembling workability. By utilizing the core parts 4A and 4B, moreover, it is possible to enhance the assembling workability of the reactor 1.

In addition, the reactor 1 produces the following effects.

(1) The inner core 31 and the outer core 32 are properly combined so that a desirable inductance can be obtained with high accuracy.

(2) Insulation performance between the coil 2 and the magnetic core 3 can be enhanced by the coating resin 5A and 5B.

(3) The core parts 4A and 4B are integrally provided with the frame-shaped portions 52A and 52B. Consequently, the number of the parts and the number of the assembling steps can further be reduced and the assembling workability is high.

(4) The core parts 4A and 4B include the engaging portion 517 and the engaging tube portions 53A and 53B. Consequently, both of the parts 4A and 4B can easily be positioned and the assembling workability is high.

(5) The core parts 4A and 4B include the rib 515 in the peripheral surface coating portions 51oA and 51oB. Consequently, the contact area of the coil elements 2A and 2B can be reduced and the inner core 31 (the stacked columnar body) can easily be inserted into the coil elements 2A and 2B, and the assembling workability is high.

(6) The core parts 4A and 4B include the positioning portions 55A and 55B of the outer core 32 in the frame-shaped portions 52A and 52B. Even if the inner end surface 32e to be a coupling surface to the inner core 31 has a flat shape, therefore, the outer core 32 can easily be positioned and high assembling workability can be obtained.

(7) Since the core parts 4A and 4B have the same shapes, productivity is high and they can easily be treated.

(8) By setting the material of the gap member 31 to be a mixture containing magnetic powder and a non-magnetic material, it is possible to reduce a loss caused by a leakage flux, and furthermore, to easily mold the gap member 31 into a desirable shape and to obtain high productivity of the gap member 31.

(9) The core parts 4A and 4B have high mold-release performance since the peripheral surface coating portions 51oA and SloB mainly have tapered external shapes, and thus productivity is high.

[First Variant]

The description has been given to the mode in which the core parts 4A and 4B of the first embodiment include the thin engaging portion 517 in the peripheral surface coating portions 51oA and 51oB and includes the engaging tube portions 53A and 53B in the frame-shaped portions 52A and 52B. In addition, the engaging portion and the engaging tube portion may be omitted in the core part. With this mode, in the same manner as in the first embodiment, the peripheral surface coating portion may have a tapered shape with a thickness varied over a whole length thereof, or may be further provided with a rib, or may have a flat shape with a uniform thickness over the whole length thereof. With this mode, the frame-shaped portion is provided with the through hole in which the other end side of the stacked columnar body can be inserted. With this mode, the shape of the core part becomes comparatively simple and the shape of the metal mold can be simplified.

[Second Variant]

The description has been given to the mode in which each of the core parts 4A and 4B of the first embodiment includes a single stacked columnar body. In addition, the core part may include two stacked columnar bodies. Examples of the core part include a mode in which two stacked columnar bodies coated with the peripheral surface coating portion are integrally coupled to a single frame-shaped portion and the end surface coating portion is provided on one end surface of each of the stacked columnar bodies. The two end surface coating portions in total are molded integrally with the single frame-shaped portion.

With this mode, if there is additionally prepared the frame-shaped member provided between the outer core coupled to the other end surfaces of both of the stacked columnar bodies in the core part and the end surface of the coil element, insulation performance between the coil and the magnetic core can be enhanced. It is possible to utilize a frame-shaped member including two through holes in which two stacked columnar bodies can be inserted respectively, and furthermore, a frame-shaped member including two engaging tube portions.

With this mode, productivity is high since the coil element can be inserted into, for example, the two stacked columnar bodies provided in the core part at the same time.

[Third Variant]

The description has been given to the mode in which the parts 4A and 4B provided in the first embodiment include the frame-shaped portions 52A and 52B integrally. In addition, the frame-shaped portion may be omitted in the core part. In the core part, the coating resin includes only the peripheral surface coating portion and the end surface coating portion. Therefore, the shape becomes simple and the shape of the metal mold can be simplified. If the engaging portion is also omitted in the peripheral surface coating portion, the shape can further be simpler.

In the case in which a reactor includes a coil having a pair of coil elements, for example, a pair of frame-shaped members having the two through holes and the two more engaging tube portions described in the second variant are prepared additionally and are assembled into the core part according to the third variant so that the insulation performance of the coil and the outer core can be enhanced. In the case in which a reactor includes a single coil, for example, a ring-shaped member including a flange extended outward from the peripheral edge of the engaging tube portion is prepared and assembled into the core part according to the third variant so that insulation performance of a portion disposed on the end surface side of the coil in the magnetic core and the coil can be enhanced.

[Second Embodiment]

The reactor according to any of the first embodiment and the first to third variants may be used for a component of a converter mounted on a vehicle or the like, or a component of a power conversion device including the converter, for example.

Figure 5:
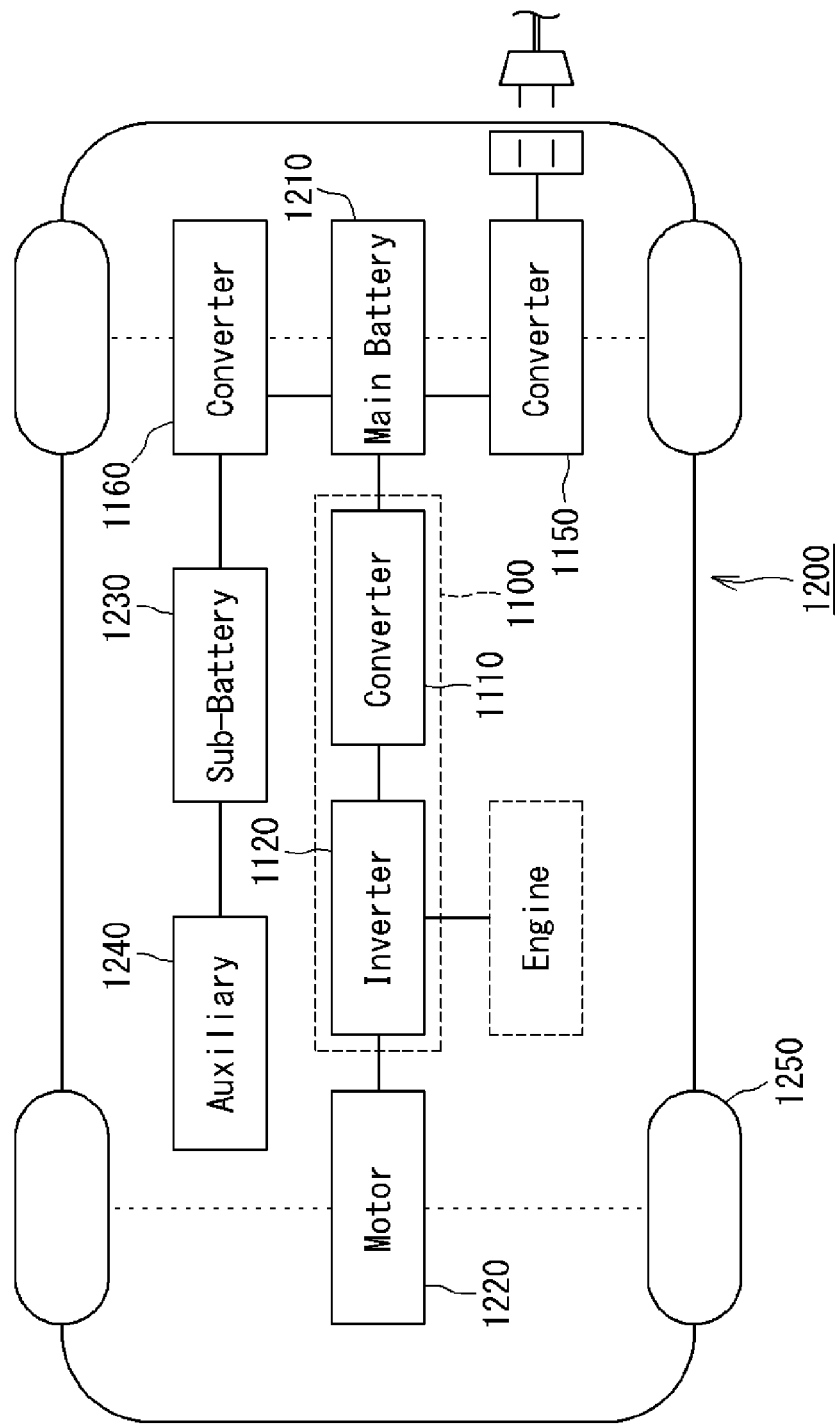
FIG. 5 is a brief configuration diagram schematically showing a power supply system of a hybrid electric vehicle.

For example, as shown in FIG. 5, a vehicle 1200, which is a hybrid electric vehicle or an electric vehicle, includes a main battery 1210, a power conversion device 1100 connected to the main battery 1210, and a motor (a load) 1220 driven by power fed from the main battery 1210 and used for traveling. The motor 1220 is typically a three-phase alternating current motor, and drives wheels 1250 during traveling and functions as a generator during regeneration. In the case of a hybrid electric vehicle, the vehicle 1200 includes an engine in addition to the motor 1220. Although FIG. 5 illustrates an inlet as a charging portion of the vehicle 1200, a plug may be included.

The power conversion device 1100 includes a converter 1110 connected to the main battery 1210, and an inverter 1120 that is connected to the converter 1110 and performs conversion between direct current and alternating current. During traveling of the vehicle 1200, the converter 1110 described in this example steps up a direct-current voltage (input voltage) of the main battery 1210, which is in a range from about 200 to 300 V, to a level in a range from about 400 to 700 V, and then feeds the power to the inverter 1120. Also, during regeneration, the converter 1110 steps down the direct-current voltage (the input voltage) from the motor 1220 through the inverter 1120 to a direct-current voltage suitable for the main battery 1210, and then uses the direct-current voltage for the charge of the main battery 1210. During traveling of the vehicle 1200, the inverter 1120 converts the direct current stepped up by the converter 1110 into predetermined alternating current and feeds the alternating current to the motor 1220. During regeneration, the inverter 1120 converts the alternating current output from the motor 1220 into direct current and outputs the direct current to the converter 1110.

Figure 6:
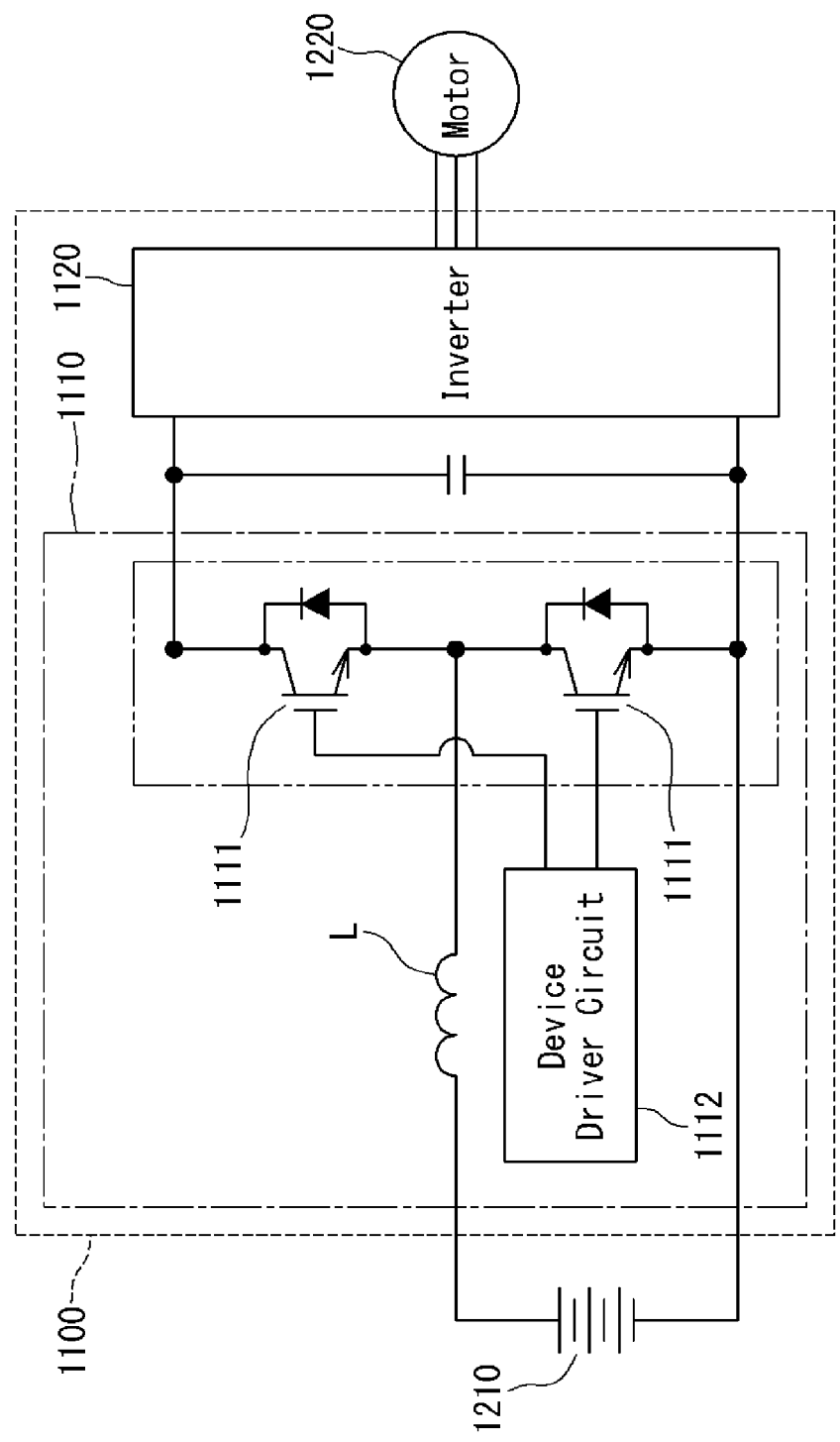
FIG. 6 is a brief circuit diagram showing an example of a power conversion device according to the invention including a converter according to the present invention.

As shown in FIG. 6, the converter 1110 includes a plurality of switching elements 1111, a driving circuit 1112 that controls operations of the switching elements 1111, and a reactor L. The converter 1110 converts the input voltage (in this situation, performs step up and down) by repetition of ON and OFF operations (switching operations). The switching elements 1111 each use a power device, such as a field effect transistor (FET), an insulated-gate bipolar transistor (IGBT). The reactor L uses a characteristic of a coil that disturbs a change of current which flows through the circuit, and hence has a function for making the change smooth when the current is increased or decreased by the switching operation. The reactor L is the reactor according to any of the first embodiment and the first to third variants. Since the reactor 1 with high assembling workability or the like is included, the power conversion device 1100 and the converter 1110 have high productivity.

The vehicle 1200 includes, in addition to the converter 1110, a feeding device converter 1150 connected to the main battery 1210, and an auxiliary power supply converter 1160 that is connected to a sub-battery 1230 serving as a power source of an auxiliary 1240 and the main battery 1210 and that converts a high voltage of the main battery 1210 to a low voltage. The converter 1110 typically performs DC-DC conversion, whereas the feeding device converter 1150 and the auxiliary power supply converter 1160 perform AC-DC conversion. The feeding device converter 1150 may include a kind that performs DC-DC conversion. The feeding device converter 1150 and the auxiliary power supply converter 1160 each may include a structure similar to the reactor according to any of the first embodiment and the first to third variants, and the size and shape of the reactor may be properly changed. Also, the reactor according to any of the first embodiment and the first to third variants may be used for a converter that performs conversion for the input power and that performs only stepping up or stepping down.

The present invention is not limited to the above-described embodiments, and may be properly modified without departing from the scope of the present invention. For example, the core part for the reactor according to the present invention can be the component of the outer core, that is, a portion where the coil is not disposed in the magnetic core.

INDUSTRIAL APPLICABILITY

The reactor according to the present invention can be preferably used for a component of a power conversion device, such as an on-vehicle converter (typically a DC-DC converter) mounted on a vehicle, such as a hybrid electric vehicle, a plug-in hybrid electric vehicle, an electric vehicle, or a fuel cell vehicle, or a converter of an air conditioner. The core part for the reactor according to the present invention can be preferably used for the component of the reactor.

REFERENCE SIGNS LIST

1: REACTOR
2: COIL
2a, 2b: COIL ELEMENT
2r: COUPLING PORTION
2w: WIRE
3: MAGNETIC CORE
31: INNER CORE
31e: END SURFACE
31m: CORE PIECE
31g: GAP MEMBER
32: OUTER CORE
32e: INNER END SURFACE
4A, 4B: CORE PART
5A, 5B: COATING RESIN
51oA, 51oB: PERIPHERAL SURFACE COATING PORTION
51eA: END COATING PORTION
52A, 52B: FRAME-SHAPED PORTION
53A, 53B: ENGAGING TUBE PORTION
54A, 54B: MOUNT
55A, 55B: POSITIONING PORTION
56A, 56B: PARTITION
510: HOLLOW HOLE
511: INCLINED PORTION
513: BASE COATING PORTION
515: RIB
517: ENGAGING PORTION
530: THROUGH HOLE
1100: POWER CONVERSION DEVICE
1110: CONVERTER
1111: SWITCHING ELEMENT
1112: DRIVING CIRCUIT
L: REACTOR
1120: INVERTER
1150: FEEDING DEVICE CONVERTER
1160: AUXILIARY POWER SUPPLY CONVERTER
1200: VEHICLE
1210: MAIN BATTERY
1220: MOTOR
1230: SUB-BATTERY
1240: AUXILIARY
1250: WHEEL

The invention claimed is:

1. A reactor having a cylindrical coil and a magnetic core where the coil is disposed, the reactor comprising:
a stacked columnar body which configures a portion disposed on an inside of the coil in the magnetic core and in which a plurality of core pieces made of a magnetic material and at least one gap member made of a material having a lower magnetic permeability than the plurality of core pieces are stacked; and
coating resin which coats the stacked columnar body and is molded integrally,
wherein at least one end surface of the stacked columnar body is made of one of the plurality of core pieces, and
wherein the coating resin includes a peripheral surface coating portion for coating at least a part of an outer peripheral surface of the stacked columnar body to integrally hold the plurality of core pieces and the gap member and an end surface coating portion for coating at least a part of the end surface, which is made of the one of the plurality of core pieces, of the stacked columnar body,
wherein the coil includes a pair of coil elements,
wherein the magnetic core includes a pair of inner cores disposed on an inside of the coil elements respectively and formed by the stacked columnar body, and a pair of outer cores in which the coil elements are not disposed but are disposed to interpose both of the inner cores arranged side by side therebetween, and
wherein the coating resin includes the peripheral surface coating portion and the end surface coating portion which coat the stacked columnar body configuring one of the inner cores, and a frame-shaped portion which is provided between an end surface of the coil element and an inner end surface disposed on the inner core side in the outer core and is molded integrally with the end surface coating portion,
wherein the end surface coating portion coats only a part of one end surface of the stacked columnar body and the other portion of the one end surface is exposed from the coating resin, and
wherein the frame-shaped portion includes the end surface coating portion and a through hole in which the other of the pair of inner cores is inserted.

2. The reactor according to claim 1, wherein the gap member is made of a mixture containing magnetic powder and a non-magnetic material.

3. A converter comprising:
a switching element;
a driving circuit that controls an operation of the switching element; and
a reactor that smoothens a switching operation,
the converter converting an input voltage by the operation of the switching element,
wherein the reactor is the reactor according to claim 1.

4. A power conversion device comprising:
a converter that converts an input voltage; and
an inverter that is connected to the converter and performs conversion between direct current and alternating current,
the power conversion device driving a load with a power converted by the inverter,
wherein the converter is the converter according to claim 3.

5. A reactor having a cylindrical coil and a magnetic core where the coil is disposed, the reactor comprising:
a stacked columnar body which configures a portion disposed on an inside of the coil in the magnetic core and in which a plurality of core pieces made of a magnetic material and at least one gap member made of a material having a lower magnetic permeability than the plurality of core pieces are stacked; and
coating resin which coats the stacked columnar body and is molded integrally,
wherein at least one end surface of the stacked columnar body is made of one of the plurality of core pieces, and
wherein the coating resin includes a peripheral surface coating portion for coating at least a part of an outer peripheral surface of the stacked columnar body to integrally hold the plurality of core pieces and the gap member and an end surface coating portion for coating at least a part of the end surface, which is made of the one of the plurality of core pieces, of the stacked columnar body,
wherein the peripheral surface coating portion includes a base coating portion having a tapered shape with a small thickness from one end surface side toward the other end surface side in the stacked columnar body provided with the end surface coating portion, and a rib protruded from a surface of the base coating portion and extended in an axial direction of the stacked columnar body, and wherein a protrusion height of the rib is increased from the one end surface side toward the other end surface side in the stacked columnar body provided with the end surface coating portion.

6. The reactor according to claim 5, wherein the gap member is made of a mixture containing magnetic powder and a non-magnetic material.

7. A converter comprising:
a switching element;
a driving circuit that controls an operation of the switching element; and
a reactor that smoothens a switching operation,
the converter converting an input voltage by the operation of the switching element,
wherein the reactor is the reactor according to claim 5.

8. A power conversion device comprising:
a converter that converts an input voltage; and
an inverter that is connected to the converter and performs conversion between direct current and alternating current,
the power conversion device driving a load with a power converted by the inverter,
wherein the converter is the converter according to claim 7.

9. A core part for a reactor to be used for a magnetic core where a cylindrical coil is disposed, the core part comprising:
a stacked columnar body in which a plurality of core pieces made of a magnetic material and at least one gap member made of a material having a lower magnetic permeability than the plurality of core pieces are stacked; and
coating resin which coats the stacked columnar body and is molded integrally, wherein at least one end surface of the stacked columnar body is made of one of the plurality of core pieces, and wherein the coating resin includes a peripheral surface coating portion for coating at least a part of an outer peripheral surface of the stacked columnar body to integrally hold the plurality of core pieces and the gap member and an end surface coating portion for coating at least a part of the end surface, which is made of the one of the plurality of core pieces, of the stacked columnar body, wherein the coil includes a pair of coil elements, wherein the stacked columnar body is disposed on an inside of one of the pair of coil elements, and wherein the coating resin includes the peripheral surface coating portion and the end surface coating portion which coat the stacked columnar body, and a frame-shaped portion which is provided between a portion where both of the coil elements are not disposed in the magnetic core and end surfaces of both of the coil elements, and is molded integrally with the end surface coating portion, wherein the end surface coating portion coats only a part of one end surface of the stacked columnar body and the other portion of the one end surface is exposed from the coating resin, and wherein the frame-shaped portion includes the end surface coating portion and a through hole in which another stacked columnar body disposed on an inside of the other of the pair of coil elements is inserted.

* * * * *